United States Patent
Junior et al.

(10) Patent No.: US 6,537,596 B1
(45) Date of Patent: Mar. 25, 2003

(54) ENCAPSULATED/AIR-FREE CRUSHING AND MASH PRODUCTION

(75) Inventors: August Lenz Junior, Kitzingen (DE); Hans Herrmann, Sommerach (DE); Bernd Kantelberg, Volkach (DE)

(73) Assignee: HRCH. Huppman GmbH (DE)

( * ) Notice: Subject to any disclaimer, the term of this patent is extended or adjusted under 35 U.S.C. 154(b) by 0 days.

(21) Appl. No.: 09/486,014

(22) PCT Filed: Aug. 21, 1998

(86) PCT No.: PCT/DE98/02523

§ 371 (c)(1),
(2), (4) Date: Feb. 18, 2000

(87) PCT Pub. No.: WO99/13047

PCT Pub. Date: Mar. 18, 1999

(30) Foreign Application Priority Data

Sep. 11, 1997 (DE) .......................................... 197 40 036

(51) Int. Cl.[7] .............................. C12C 7/01; B02C 4/00; B02C 23/24
(52) U.S. Cl. ......................... 426/28; 426/29; 426/518; 99/286; 241/6; 241/12; 241/18; 241/31
(58) Field of Search .............................. 426/16, 18, 28, 426/29, 518; 99/278, 279, 286; 241/6, 15, 18, 12, 31

(56) References Cited

U.S. PATENT DOCUMENTS 6,076,752 A * 6/2000 Paradowski et al. .......... 241/16

FOREIGN PATENT DOCUMENTS

| | | |
|---|---|---|
| DE | 1 070 121 | 4/1957 |
| DE | 0 104 160 | 3/1984 |
| DE | 42 38 069 | 11/1992 |
| EP | 0 597 462 A | 5/1994 |
| FR | 2 506 324 A | 11/1982 |
| JP | 403196848 | * 8/1991 |

OTHER PUBLICATIONS

Abstract of FR Patent 2506324, published Nov. 26, 1982, Inventor cauwe et al.*
Stiess, Matthias, Mechanische Verfahrens-technik 2, German.
Dworsky, Jaroslav and Lense, Karl, 1926, Katechismus der Brauerei–Praxis German.
Kunze, Wolfgang, 1998, Technologie Brauer und Mälzer, German.
Kunze, Wolfgang 1994, Technologie Brauer und Mälzer, German.
Bühler AG, Vertica Vertikalrotormühle, German.
Derwent Publications Ltd., Feb. 20, 1996, Database WPI, Section Ch, Week 9696.

* cited by examiner

Primary Examiner—Curtis E. Sherrer
(74) Attorney, Agent, or Firm—McGlew and Tuttle, P.C.

(57) ABSTRACT

A plant and a process for crushing and mash production is provided wherein the raw material to be processed is broken up and mashed in a mill system. Prior to the mill system (1) being filled with the material (6) to be crushed the mill system is filled with an inert gas from a gas reservoir (13) so that the atmospheric oxygen in the mill system (1) is substantially displaced. After the mill system (1) has been filled, the latter is sealed in substantially gas-tight manner and the raw material (6) is ground and mashed in, subject to exclusion of atmospheric oxygen.

21 Claims, 2 Drawing Sheets

ENCAPSULATED/AIR-FREE CRUSHING AND MASH PRODUCTION

FIELD OF THE INVENTION

The invention relates to crushing and mash production with a view to the preparation of beer in a brewery, the raw material to be processed being broken up in a mill system and then mashed in.

BACKGROUND OF THE INVENTION

The beer-preparation process begins in its first phase with the crushing of the raw materials. In this phase the raw material arriving for processing is broken up in a malt mill, for example in a hammer mill, roll mill or disc mill, and is transformed, according to demand, into a crushed malt of highly diverse composition and consistency. In the course of the breaking-up of the raw material arriving for processing—for example, malt, barley, millet or the like— the various constituents of the raw material are exposed, by reason of the structural transformation, to the atmospheric oxygen that is present in the atmosphere within the malt mills. This results in oxidation processes and enzymatic activities which have a negative influence on the beer-preparation process, since they have effects impairing flavour and stability.

Further oxidation of the raw-material constituents occurs in the course of the subsequent mashing-in of the crushed raw material at the end of the mill system. Since the activity of the enzymes and the associated oxidation processes are intensified considerably in the course of mashing-in as a result of the addition of water, the undesirable oxidation of the raw materials in the premashers used for mashing-in, in the doughing screws, in the mash pumps and in the mash vessel is continued and intensified. All the more so, since by reason of brew-specific properties the temperature of the admixed water in the course of mashing-in is around the optimal temperature for the effectiveness of the enzyme groups.

SUMMARY AND OBJECTS OF THE INVENTION

It is therefore an object of the present invention to make available a process for crushing and mash production in a mill system, wherein oxidation of the raw materials employed as a result of crushing and mashing-in is minimized or eliminated. It is a further object of the invention to make available a plant for crushing and mash production in which the process according to the invention can be carried out. These objects are achieved by means of a process having the features of the invention.

With the process according to the invention the mill system is filled with an inert gas prior to being filled with the raw material to be crushed. The atmospheric oxygen in the interior of the mill system is substantially displaced by the inert gas. This means that substantially no atmospheric oxygen is present any longer in the mill system prior to the mill system being filled. After the immediately ensuing filling of the mill system from the raw-material silo the mill system is substantially sealed in gas-tight manner. This sealing of the mill system relates to all parts of the plant where atmospheric oxygen could penetrate unhindered into the mill system, that is to say, in particular, into the charging shaft for the supply of raw material. The transition of the mill system to the mash vessel situated downstream is sealed by the liquid in the pipelines and in the mash pump. As a result, crushing and mashing-in of the raw materials is then effected in the mill system, which is encapsulated in gas-tight manner, in a substantially oxygen-free atmosphere of inert gas oxidation of particles of raw material can therefore be greatly, minimized.

During the filling of the mill system with raw material from the raw-material silo the mill system has to be opened for a short time. As a result, some air is able to penetrate into the mill system through the raw-material supply. Some atmospheric oxygen is also introduced into the plant with the raw material that is supplied. In case, with a view to further quality enhancement, displacement of this residual oxygen or of residual oxygen that has penetrated as a result of other smaller leaks is desired, the mill system can subsequently be flushed, at least zonally, with inert gas. In this way atmospheric oxygen that has penetrated during the filling of the mill system or via other leaks is displaced. To this end, excess gas volume is pressed out of the mill system by means of inert-gas overpressure, for example. Flushing with inert gas may also be continued after the start of the crushing and mashing-in process. As a result of this it is possible for the entire crushing and mashing-in process to be managed in a controlled inert-gas atmosphere. Hence, during the production process only slight traces of atmospheric oxygen are available, and undesirable oxidation processes are substantially avoided.

It is particularly advantageous to generate an inert-gas atmosphere having an inert-gas overpressure in the mill system. As a consequence of this overpressure no atmospheric oxygen is able to penetrate into the plant as a result of small leaks which may be present. The design tolerances with respect to the impermeability of the plant to gas may therefore be made wider, permitting a reduction in cost in connection with the manufacture of the requisite plant components.

The inert gas should be fed into the plant with an overpressure in the range from 2 to 100 mbar. In this connection the plant should exhibit sufficient impermeability to gas in order to be able substantially to maintain this overpressure.

By way of inert gases, use may be made of all gases that prevent, or at least minimize, oxidation of the raw materials during the crushing and mashing-in processes and that at the same time are unobjectionable as regards food technology. It is particularly advantageuos, however, to employ an inert gas that is heavier than air. If the inert gas is heavier than air, the atmospheric oxygen in the mill system is displaced upward by reason of the higher specific weight of the inert gas. Inert gas that is introduced into the mill system collects at the lowest point of the mill system and, proceeding from here , fills up the mill system. The residual air which may be contained in the mill system consequently floats on a cushion of inert gas and can therefore be displaced further and further upward simply by adding further quantities of inert gas. This has advantages, particularly when the plant is not to be flushed with a current of inert gas after being filled with raw materials. In this case, oxygen introduced with the raw material can be displaced upward in the plant by the heavier inert gas to a location where oxidation of the raw materials is not to be feared, since the raw materials have not yet been broken up.

Since the process according to the invention serves to produce a foodstuff, carbon dioxide, nitrogen or similar gas mixtures should preferably be used by way of inert gases. These gases have sufficient oxidation-inhibiting action to prevent the undesirable oxidation of the raw materials. Since these gases are also contained proportionately in respiratory air, no relevant toxic effect arises by reason of the influence of these inert gases on the raw materials.

Particularly preferred is the use of nitrogen obtained from air by means of a preceding gas-separation process. Since air has a high nitrogen content, this inert gas can be produced from air in sufficient purity and very cost-effectively with the aid of a gas-separation process. By way of gas-separation process, use may be made, for example, of membrane separation processes that are known as such. Production of the nitrogen from air has the advantage, moreover, that the plant thereby presents an equalized emission balance with respect to the inert gas. Nitrogen that is discharged from the plant mixes again with the air from which the nitrogen was previously separated. Overall no nitrogen is emitted from external sources. In principle it is immaterial, according to the invention, in which direction the inert gas flows when the mill system is flushed. The direction of the current is primarily determined by where inert gas is supplied and at which point of the mill system excess inert gas is able to flow out, since the gas flows from the inlet openings to the outlet openings. It is particularly preferred to direct the current of the inert gas in the mill system contrary to the direction of motion of the raw material during the crushing and mashing-in process. As a result the gas flows towards the particles of raw material and can therefore wash around the raw materials in particularly effective manner and can in particular also displace atmospheric oxygen that is bound to the surface of the particles of raw material. In addition, if the inert gas is heavier than air, the upward-directed current assists the displacement of the oxygen upward as a consequence of the higher specific weight. The outlet opening should therefore be arranged as high as possible in the mill system and the inlet opening for the inert gas should be arranged as low as possible.

The process according to the invention is primarily provided for the purpose of displacing atmospheric oxygen from the mill system. However, according to the invention it is also readily possible to incorporate the mash vessel situated downstream of the mill system into the process for displacing atmospheric oxygen. To this end the mash vessel has to be connected to the gas supply in a manner equivalent to that of the mill system and has to be pressurized prior to being filled with inert gas. After being filled with inert gas the mash vessel should then likewise be encapsulated in gas-tight manner in order to prevent penetration of oxygen. Hence the atmospheric oxygen is also displaced from the mash vessel, and undesirable oxidation processes on the surface of the mash and of the mash vessel are prevented.

The mash vessel either may be directly connected to the gas supply or may be provided with inert gas indirectly via the mill system. If the mash vessel is supplied indirectly, a special pressure-regulation system for the mash vessel may be dispensed with. Differing pressures in the mill system and in the mash vessel which would press the mash from one part of the plant into the others are prevented by means of an equalisation of gas pressure between mash vessel and mill system.

According to the invention it is sufficient to fill the mill system with a certain quantity of inert gas and possibly to flush it subsequently in unregulated manner with a fixed quantity of inert gas in order to displace the atmospheric oxygen. Better utilization of the requisite quantity of inert gas and more complete prevention of the undesirable oxidation processes are possible, however, by the flushing of the mill system with inert gas being regulated as a function of the residual content of atmospheric oxygen. In this connection the gas composition is measured with sensors at one or more points of the mill system and the supply of inert gas is regulated as a function of this composition. Consequently no inert gas is wasted, and at the same time it is ensured that the residual content of atmospheric oxygen does not exceed a permissible value.

Plants for operating the process according to the invention may be designed in substantial parts like conventional mill systems. Conventional mill systems are charged via a raw-material supply with raw materials to be processed which are subjected within the plant to a crushing and mashing-in process and are transferred in the form of mash through the mash outlet into the mash vessel. According to the invention these conventional mill systems should be modified in such a way that the outer wall of the plant of the mill system is encapsulated in substantially gas-tight manner and the supply of raw material is capable of being shut off with a substantially gas-tight packing element. This results in a mill system that presents no relevant leakage points through which atmospheric oxygen can penetrate in relatively large quantities and in uncontrolled manner.

The plant according to the invention must furthermore comprise a gas supply with which the interior of the plant can be pressurized with inert gas. Via the gas supply the interior of the plant can be filled with inert gas, in which connection an inert-gas atmosphere is formed in the interior of the plant and the atmospheric oxygen is displaced. During the filling of the plant with inert gas or raw material, excess portions by volume of the gas atmosphere in the interior of the plant escape to the outside via an opened valve or the like. After the charging with inert gas and raw material the plant is encapsulated in gas-tight manner and no atmospheric oxygen is able to penetrate into the mill system.

If it is also intended for the atmospheric oxygen that has been re-introduced into the plant with the supplied raw material to be displaced with a view to quality enhancement, the gas supply should be opened again after the filling with raw material and, as a consequence of the overpressure resulting therefrom, gas is pressed outward from the interior of the plant at a valve or the like and the interior of the plant is flushed with inert gas as a result. The atmospheric oxygen introduced with the raw material can consequently be removed from the interior of the plant. The supply of gas should also be continued during the further crushing and mashing-in process, so that penetration of atmospheric oxygen is effectively prevented by means of an internal pressure, and changes of volume as a consequence of the withdrawal of mash are compensated. According to the invention the inert gas or gas/air mixture issuing from the plant can be collected and either discharged into the open air or transferred to a recovery plant with a view to further use.

If it is also intended for the production process in the mash vessel to be managed subject to exclusion of oxygen, the mash vessel likewise has to be capable of being shut off in gas-tight manner. The inert gas may be supplied directly from the gas supply system or indirectly via the mill system. In this connection an equalization of pressure between the two plant components should be provided, in order to prevent differential pressures. The packing element for shutting off the supply of raw material may be constructed in particularly simple manner in the form of a substantially gas-tight flap valve. Flap valves of this type are known in principle and merely have to be modified to the effect that a gastight packing joint is provided between the flap valve and the wall of the raw material supply obviously it is sufficient to supply the inert gas at only one point of the plant.

However, with regard to a more favorable control of the plant it is advantageous to arrange inlet openings for the supply of inert gas in the malt hopper and/or in the conditioning shaft and/or in the mill body. Hence the plant can be filled with inert gas from bottom to top and, if required, a particularly effective, upward-directed current of inert gas can be formed during the crushing and mashing-in process. In order to achieve a better distribution of gas, several inlet openings for the supply of inert gas may be provided in each part of the plant. If a separate gas supply is provided in each of the various parts of the plant it is in addition possible to flush individual parts of the plant, for example the mill body and the conditioning shaft, very rapidly with inert gas by means of an intense admission of gas so that the crushing and mashing-in process can begin immediately, without having to wait for total displacement of the atmospheric oxygen also from the malt hopper situated above. Generally speaking, the displacement of the atmospheric oxygen can be influenced more effectively if separate inlet openings for the gas supply are provided in all parts of the plant. In the mill body the inlet opening for the supply of inert gas should preferably be arranged in the region between malt mill and mash. The raw materials to be processed are broken up in the malt mill and are therefore particularly susceptible to oxidation immediately thereafter. Therefore the particles of raw material in this region should be washed with inert gas in particularly intensive manner, in order as far as possible to prevent oxidation with residual oxygen which may be present. If the residual content of atmospheric oxygen in the plant is to be regulated, sensors for measuring the gas atmosphere must be arranged in the various regions of the plant, in accordance with the regulating algorithm. With these sensors it is possible for the composition of the gas atmosphere in the respective regions to be determined and for the supply of inert gas to the individual regions of the plant to be regulated on the basis of these data.

Since, according to the invention, the plant is constructed in substantially gas-tight manner and inert gas is supplied via a gas supply, a safety valve should be provided in the plant for protection against excessive overpressures or underpressures. It for example, too much inert gas is supplied unintentionally, impermissibly high overpressures may build up. In order to prevent damage to the structural components it is therefore necessary in this case to let off the overpressure building up via a safety valve. This safety valve or a second safety valve must also be opened in the event of excessive underpressures within the plant. Since volume is permanently removed as a result of the withdrawal of mash during the mashing-in process, an underpressure can build up in the plant in the event of inadequate further provision of inert gas.

It is particularly advantageous to measure the internal pressure in the interior of the plant permanently and, by means of a regulator, to trigger a controllable inlet valve for inert gas and also a controllable outlet valve, depending on the internal pressure. By virtue of this regulating circuit a constant overpressure of inert gas in the plant can be ensured, irrespective of the state of other aspects of the production process. Impermissible overpressures and underpressures are then also ruled out.

It is particularly preferable if the plant is capable of being deaerated via a surge tank. By draining off the water that has been poured in, a large cross-section can be opened in such surge tanks, thus facilitating or accelerating emission of the displaced air from the plant, for example in the course of filling the plant with inert gas prior to the supply of raw material. All other degasification processes may also be accelerated by displacing the corresponding gases via the opened surge tank.

According to the invention, valves may be provided in the gas-supply pipelines so that the gas supply overall is enabled by shutting off the main supply and/or the gas supply to individual parts of the plant is enabled by shutting off the respective supply line. To this end, use may be made in particular of valves that are infinitely adjustable and/or capable of being operated electrically. The invention is elucidated in more detail below on the basis of a drawing representing merely preferred embodiments of a plant according to the invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
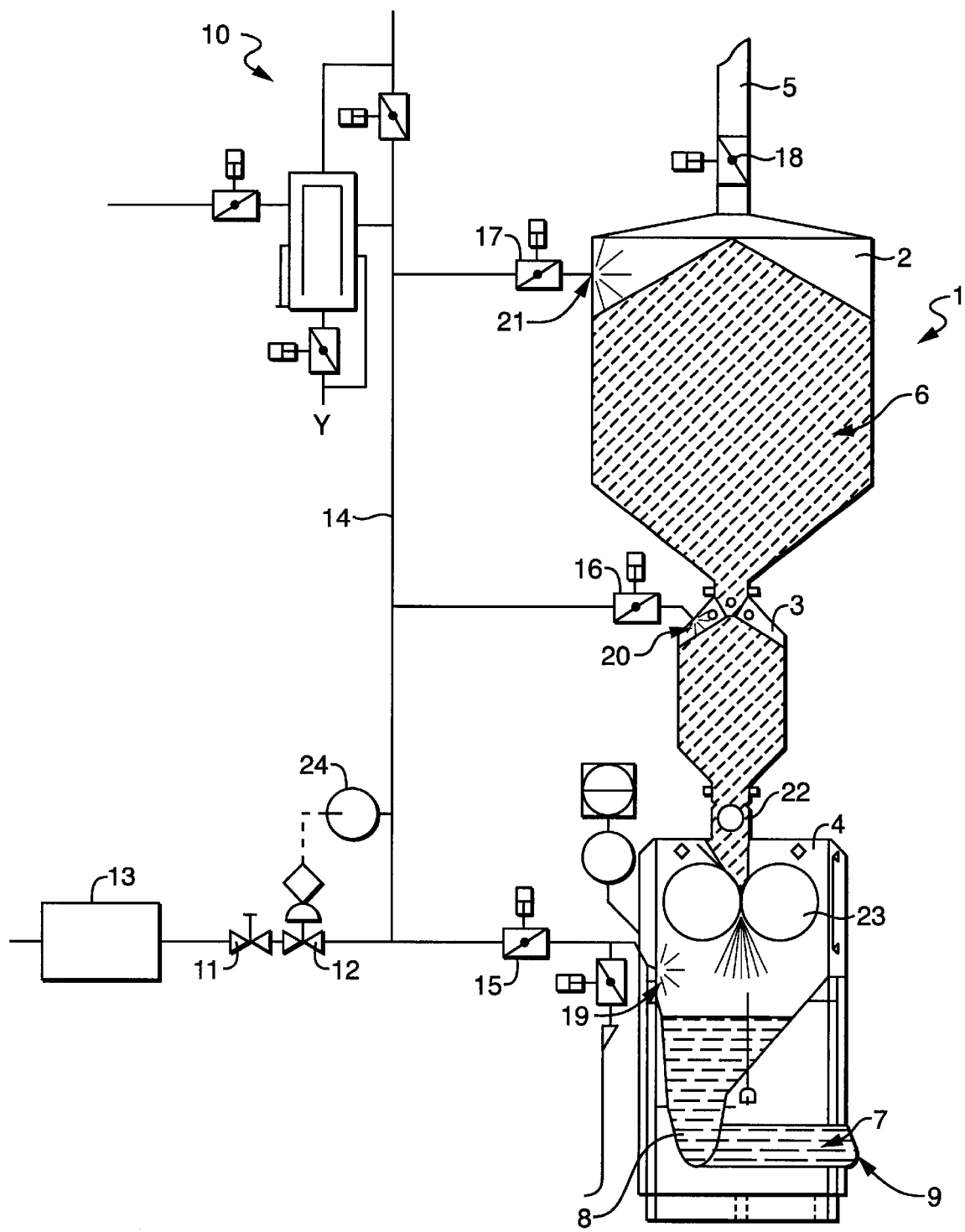
FIG. 1 in schematic view of the structure of a first embodiment of a plant according to the invention for crushing and mash production.

Referring to the drawings in particular, a mill system 1 of the invention has a malt hopper 2, a conditioning shaft 3 and a mill body 4 can be charged with the raw material 6 from a raw-material silo, which is not represented, via the raw-material supply 5. The raw material 6 is processed within the mill system in a crushing and mashing-in process, and the mash 7 is pumped by the mash pump 8 into a mash vessel, which is not represented, via the mash outlet 9.

If the mill system is to be freshly charged, according to the invention firstly the surge tank 10 is drained so that the air contained in the interior of the plant can escape in an unpressurized manner at this point. After the shut-off valves 11 and 12 in the main supply have been opened, the inert gas flows across from the gas reservoir 13 into the supply-line system 14. Now the valves 15, 16 and 17 are opened in ascending sequence, and the inert gas, which is heavier than air, fills the plant in ascending manner, starting from the lowest point. Borne by the cushion of inert gas, the air contained in the interior of the plant is conveyed from the interior of the plant to the outside through the opened surge tank 10. As soon as all the air has been displaced from the interior of the plant by the inert gas, the surge tank 10 is closed and the malt hopper 2 is filled with raw material via the raw-material supply. As soon as sufficient raw material has been supplied, the packing valve 18 is closed so that no air whatsoever is able to penetrate into the interior of the plant from outside.

Inert gas can be conveyed into the interior of the plant via the inlet openings 19, 20 and 21. By virtue of the additional volumetric portions of the inert gas that has been fed in, an overpressure ruling out any penetration of air from the external atmosphere is built up in the interior of the plant.

The actual crushing and mashing-in process is then started by starting the feed roller 22 and the squeeze roller 23. Since volumetric portions are permanently lost as a result of withdrawal of mash from the mill system after the mashing-in process has been started, steps have to be taken to prevent an underpressure arising in the interior of the plant, by virtue of which air would be drawn in again from outside. To this end the internal pressure of the plant is measured with the pressure gauge 24 and inert gas is continually supplied by opening the pressure-regulating valve 12, so that a constant overpressure of inert gas always prevails in the interior of the plant. Should impermissible overpressures arise in the plant, they are let off via a safety valve which is not represented.

Figure 2:
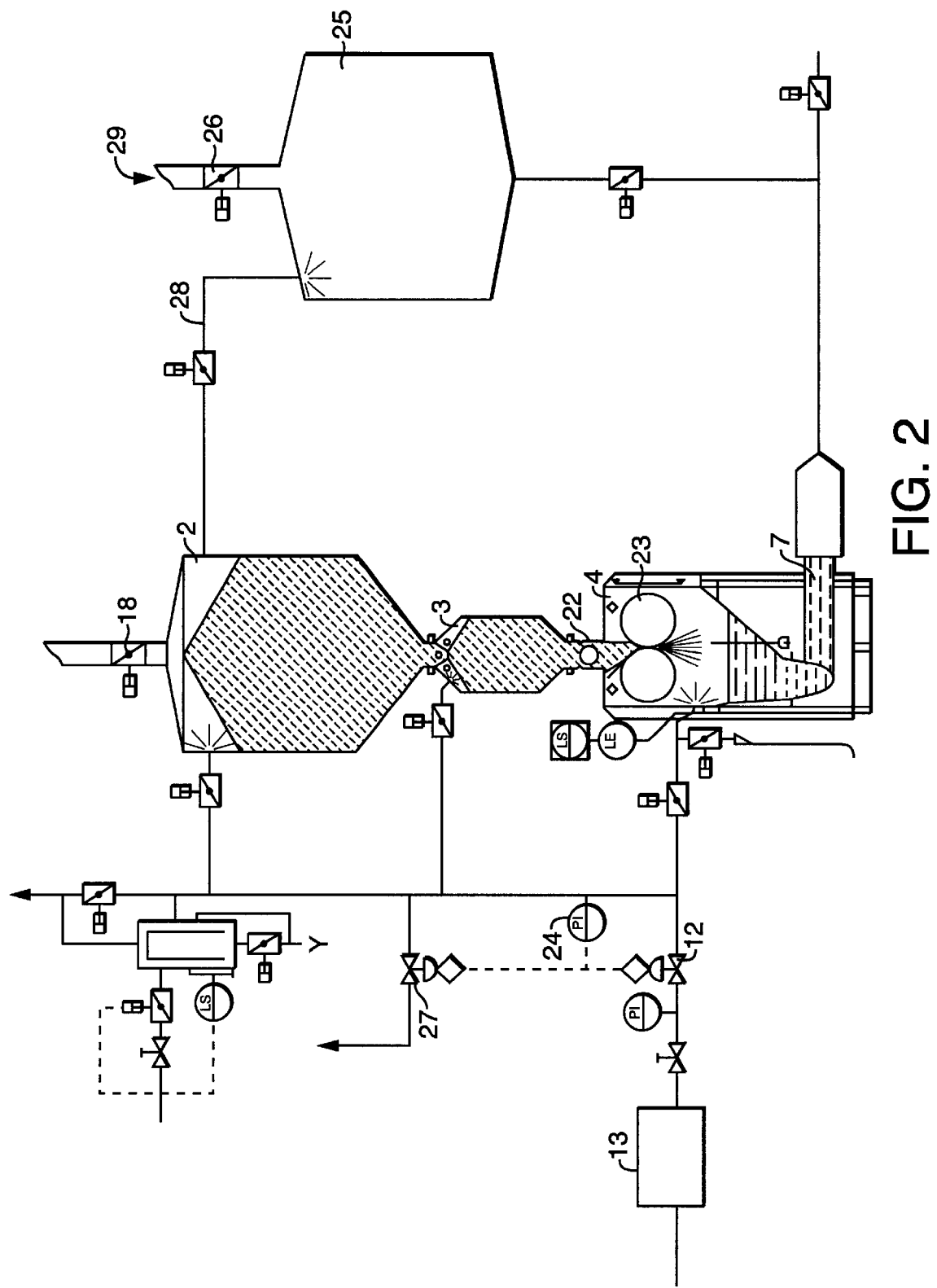
FIG. 2 in schematic view of the structure of a second embodiment of a plant according to the invention for crushing and mash production.

FIG. 2 shows a second embodiment of a plant according to the invention which coincides in substantial parts with the first embodiment. However, the mash vessel 25 is connected to the gas supply indirectly via the mill system by way of the line 28. Hence the mash vessel can also be filled with inert gas and, if required, flushed with inert gas. The mash vessel can be sealed in gas-tight manner with the flap valve 26. Deaeration of the mash vessel is effected through the outlet 29, with flap valve 26 opened. In addition, the plant has an extended system for regulating the internal pressure. Depending on the internal pressure, the pressure regulator 24 acts not only on the inlet valve 12 but also on the outlet valve 27. Consequently not only underpressures but also overpressures in the plant can be readjusted to a target value.

While specific embodiments of the invention have been shown and described in detail to illustrate the application of the principles of the invention, it will be understood that the invention may be embodied otherwise without departing from such principles.

What is claimed is:

1. A process for crushing and mash production, the process comprising:
    providing a mill system;
    breaking up and mashing raw material to be processed in the mill system;
    filling the mill system with an inert gas to displace the atmospheric oxygen in the mill system prior to the mill system being filled with the material to be crushed; and
    sealing the mill system in a gas-tight manner after the mill system has been filled with the material to be crushed.

2. The process for crushing and mash production according to claim 1, wherein during a crushing and the breaking up and mashing the mill system is flushed at least zonally with inert gas so that atmospheric oxygen penetrating during the filling with the material to be crushed is displaced.

3. The process for crushing and mash production according to claim 1, wherein an inert-gas overpressure is generated in the mill system.

4. The process for crushing and mash production according to claim 3, wherein the overpressure lies in the range from 2 to 100 millibar.

5. The process for crushing and mash production according to claim 1, wherein the inert gas is heavier than air.

6. The process for crushing and mash production according to claim 1, wherein the inert gas is one or more of carbon dioxide, nitrogen or gas mixtures including carbon dioxide and gas mixtures including nitrogen.

7. The process for crushing and mash production according to claim 1, wherein the inert gas includes nitrogen obtained from air in a gas-separation process.

8. The process for crushing and mash production according to claim 1, wherein the mill system is flushed with inert gas by directing inert gas in a direction substantially opposite to a direction of transport of the raw material.

9. The process for crushing and mash production according to claim 1, wherein a mash vessel is situated downstream of the mill system and is shut off in gas-tight manner and is then pressurised with inert gas.

10. The process for crushing and mash production according to claim 1, wherein the mash vessel a situated downstream of the mill system and is also flushed with inert gas.

11. The process for crushing and mash production according to claim 1, wherein the flushing of the mill system with inert gas is regulated as a function of the residual content of atmospheric oxygen.

12. A plant for crushing and mash production, the plant comprising:
    a raw material supply;
    a mash outlet;
    devices for crushing and mashing-in of the raw materials;
    an inert gas supply; and
    shut off and pressurization means for shutting off the entire plant gas tightly and pressurizing the plant with inert gas via said inert gas supply.

13. A plant for crushing and mash production according to claim 12, further comprising:
    a mash vessel; and
    a mash vessel shut off and presurization means for shuting off said mash vessel in a gas-tight manner and for pressurizing said mash vessel with inert gas via said inert gas supply.

14. The plant for crushing and mash production according to claim 12, wherein said shut off and presurization means includes a substantially gas-tight flap valve shutting off said raw-material supply.

15. The plant for crushing and mash production according to claim 12, further comprising an inlet opening for the supply of inert gas arranged in a malt hopper and/or in a conditioning shaft and/or in a mill body.

16. The plant for crushing and mash production according to claim 15, wherein said inlet opening for the supply of inert gas is arranged in said mill body in a region between a malt mill and mash material.

17. The plant for crushing and mash production according to claim 15, further comprising a probe for measuring the gas atmosphere, said probe being arranged in the malt hopper and/or conditioning shaft and/or in the mill body.

18. The plant for crushing and mash production according to claim 12, further comprising at least one safety valve for protection against overpressure and/or underpressure, said safety valve being arranged in the plant.

19. The plant for crushing and mash production according to claim 12, further comprising:
    at least one controllable inlet valve for the supply of inert gas;
    at least one controllable outlet valve; and
    a control system, said inlet valve and said outlet valve both being connected to said control system for regulating the internal pressure of the plant.

20. The plant for crushing and mash production according to claim 12, further comprising a surge tank, wherein the plant is capable of being deaerated via said surge tank.

21. The plant for crushing and mash production according to claim 12, further comprising valves wherein the gas supply is capable of being shut off by said valves at a main supply and/or at individual inlet openings of various parts of the plant.

* * * * *